United States Patent
Oh et al.

(10) Patent No.: US 7,723,669 B2
(45) Date of Patent: May 25, 2010

(54) OPTICAL MOVEMENT SENSING SYSTEM

(75) Inventors: Hye Ran Oh, Gyunggi-do (KR); Ho Sik You, Gyunggi-do (KR); In Cheol Chang, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/000,673

(22) Filed: Dec. 14, 2007

(65) Prior Publication Data

US 2008/0156967 A1 Jul. 3, 2008

(30) Foreign Application Priority Data

Dec. 29, 2006 (KR) .................... 10-2006-0137588

(51) Int. Cl.
*H01J 3/14* (2006.01)
*G02B 15/14* (2006.01)
(52) U.S. Cl. ...................... 250/216; 359/689
(58) Field of Classification Search .......... 250/221, 250/204, 559.27, 201.1, 201.2–201.4, 208.1, 250/216; 345/163; 359/207, 208, 366, 648, 359/668, 689, 708, 738–740, 690, 716, 772–775, 359/784–786, 791–792
See application file for complete search history.

(56) References Cited

U.S. PATENT DOCUMENTS

| | | | | |
|---|---|---|---|---|
| 3,841,736 A | * | 10/1974 | Takahashi et al. ........... | 359/749 |
| 4,045,803 A | * | 8/1977 | Baylis et al. ................. | 396/549 |
| 6,728,047 B2 | * | 4/2004 | Sato et al. .................... | 359/786 |
| 7,474,297 B2 | * | 1/2009 | Moyer et al. ................. | 345/163 |
| 7,477,461 B2 | * | 1/2009 | Bareau et al. ................ | 359/785 |
| 2002/0054438 A1 | | 5/2002 | Kaneko | |
| 2004/0264003 A1 | * | 12/2004 | Noda .......................... | 359/716 |
| 2006/0050412 A1 | * | 3/2006 | Ito et al. ...................... | 359/745 |
| 2007/0109661 A1 | * | 5/2007 | Bito et al. .................... | 359/676 |

FOREIGN PATENT DOCUMENTS

JP 2002-55273 2/2002

* cited by examiner

*Primary Examiner*—Georgia Y Epps
*Assistant Examiner*—Don Williams

(57) ABSTRACT

There is provided an optical movement sensing system which can be miniaturized and ensures a wide angle of view. The optical movement sensing system collecting light reflected from an object to be imaged on an optical sensor, the optical movement sensing system including: a wide-angle lens including a first lens element having a curved object-side surface; and a second lens element having an object-side surface in contact with an image-side surface of the first lens element and having a planar image-side surface. The optical movement sensing system with this configuration can be reduced in size and weight and has a wide angle of view. Therefore, the optical movement sensing system is applicable to a mobile device such as a mobile telecommunication terminal and assures sufficient peripheral light amount.

10 Claims, 12 Drawing Sheets

(a)

(b)

OPTICAL MOVEMENT SENSING SYSTEM

CROSS-REFERENCE TO RELATED APPLICATIONS

This application claims the priority of Korean Patent Application No. 2006-137588 filed on Dec. 29, 2006, in the Korean Intellectual Property Office, the disclosure of which is incorporated herein by reference.

BACKGROUND OF THE INVENTION

1. Field of the Invention

The present invention relates to an optical movement sensing system used in an optical pointing device, and more particularly, to an optical movement sensing system which can be miniaturized and ensures a wide angle of view.

2. Description of the Related Art

FIG. 1 is a schematic view illustrating an operational principle of a general optical pointing device.

As shown in FIG. 1, the optical pointing device includes a light source 11, a lens 13, and an image sensor 14. The light source 11 generally employs a light emitting diode (LED) and emits light. The lens 13 collects light reflected from an object 12 by the light emitted from the light source 11. The optical sensor 14 senses an image of the light collected by the lens 13 and detects movement of the object 12. The optical sensor 14 may adopt an image sensor.

The object 12 is configured as a ground or a pad corresponding to the ground in case of a general optical mouse. With a user moving the optical mouse, a relative movement of the object (ground) is detected by the optical sensor 14 to perform pointing (positioning).

Recently, attempts have been made to apply this optical pointing device to a mobile device such as a mobile telecommunication terminal.

As described above, the optical pointing device for use in the mobile telecommunication terminal employs a finger surface as an object and performs pointing by sensing movement of a finger or fingerprint through the optical sensor 14.

However, the conventional optical pointing device, when employed in practice, prevents big movement of the finger, thereby causing great discomfort to users accustomed to the general optical mouse.

As described above, to apply the optical pointing device to the mobile device such as the mobile telecommunication terminal, an optical sensing system should be small and should ensure peripheral light amount. Also, the optical system should ensure a wide angel of view so as to perceive big movement of the fingers.

Therefore, an optical movement sensing system has been in demand to overcome these limitations.

SUMMARY OF THE INVENTION

An aspect of the present invention provides an optical movement sensing system which can be miniaturized, has a wide angle of view, and ensures resolution, with a smaller number of lenses to be applicable to a mobile device such as a mobile telecommunication terminal.

An aspect of the present invention also provides an optical movement sensing system which sufficiently ensures peripheral light amount, and can be manufactured and assembled easily at a low cost.

According to an aspect of the present invention, there is provided an optical movement sensing system collecting light reflected from an object to be imaged on an optical sensor, the optical movement sensing system including: a wide-angle lens including a first lens element having a curved object-side surface; and a second lens element having an object-side surface in contact with an image-side surface of the first lens element and having a planar image-side surface.

The object-side surface of the first lens surface may be aspheric.

The wide-angle lens has overall positive refractive power.

The first lens element may have a thickness and a shape according to following condition 1, $$1.2 \leq R1/D1 \leq 3.8 \quad \text{condition 1,}$$

where R1 is a radius of curvature of the object-side surface of the first lens element, and D1 is a thickness of the first lens element on an optical axis.

The first lens element may be molded on or bonded to the object-side surface of the second lens element.

The first lens element and the second lens element may be formed integral with each other.

The first lens element and the second lens element may have different refractive indices from each other.

An aperture stop may be disposed on the object-side surface of the second lens element to block unnecessary light.

The object may reflect light emitted from a light source.

The second lens element may have an infra-red (IR) pass filter coated or attached on one of the surfaces thereof

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
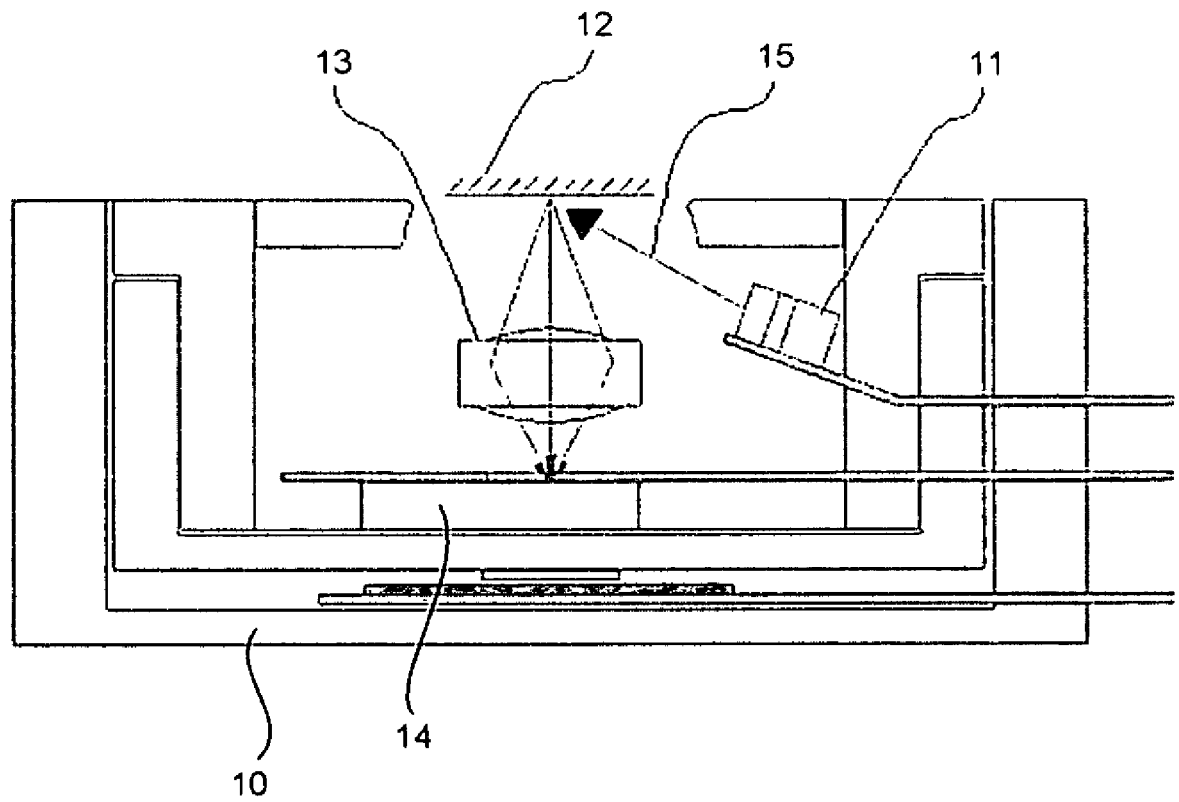
FIG. 1 is a schematic view illustrating a general optical pointing device.
Figure 2:
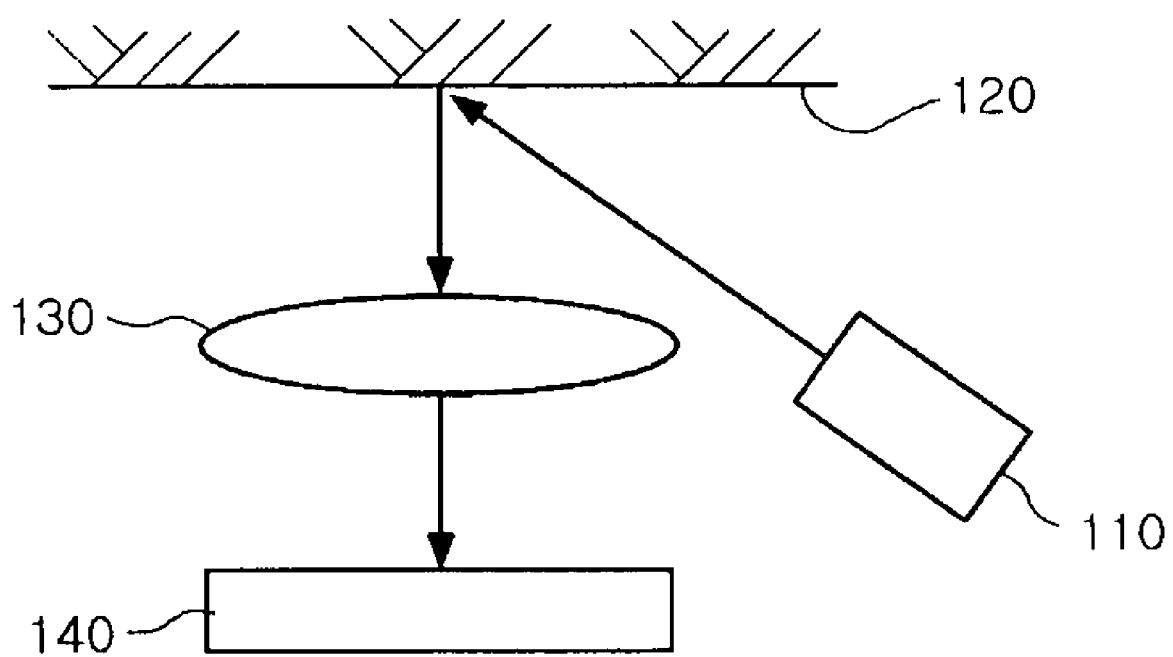
FIG. 2 is a schematic view illustrating an optical movement sensing system according to an exemplary embodiment of the invention.
Figure 3:
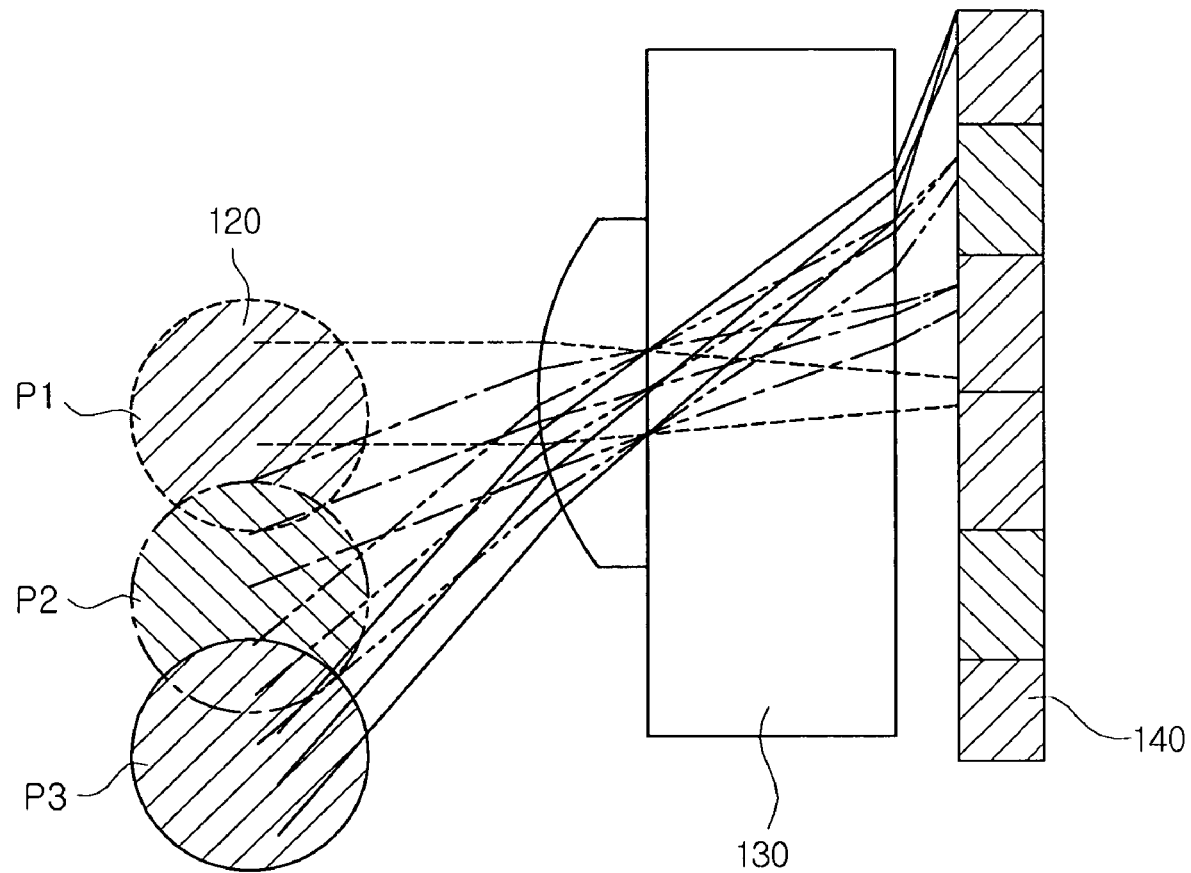
FIG. 3 is a schematic view for explaining an operation of an optical movement sensing system according to an exemplary embodiment of the invention.
Figure 4:
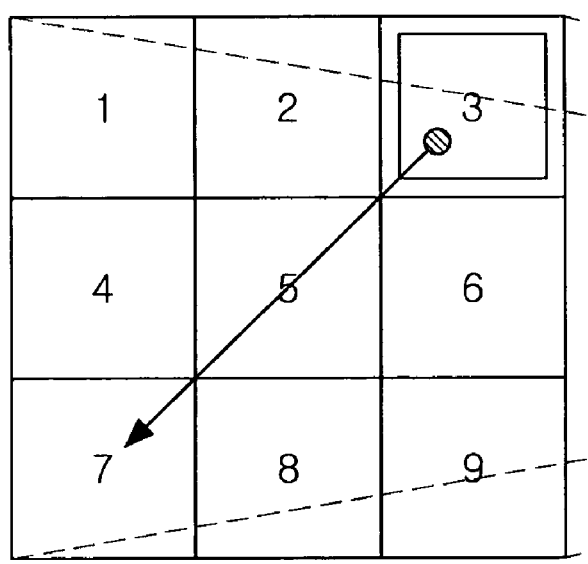
FIG. 4 is a reference view for explaining an operation of an optical movement sensing system, in which A is a schematic view illustrating movement of an object on a screen and B is a schematic view illustrating movement of an object on an image sensor.
Figure 4:
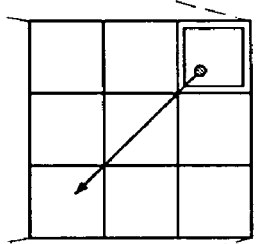
Figure 5:
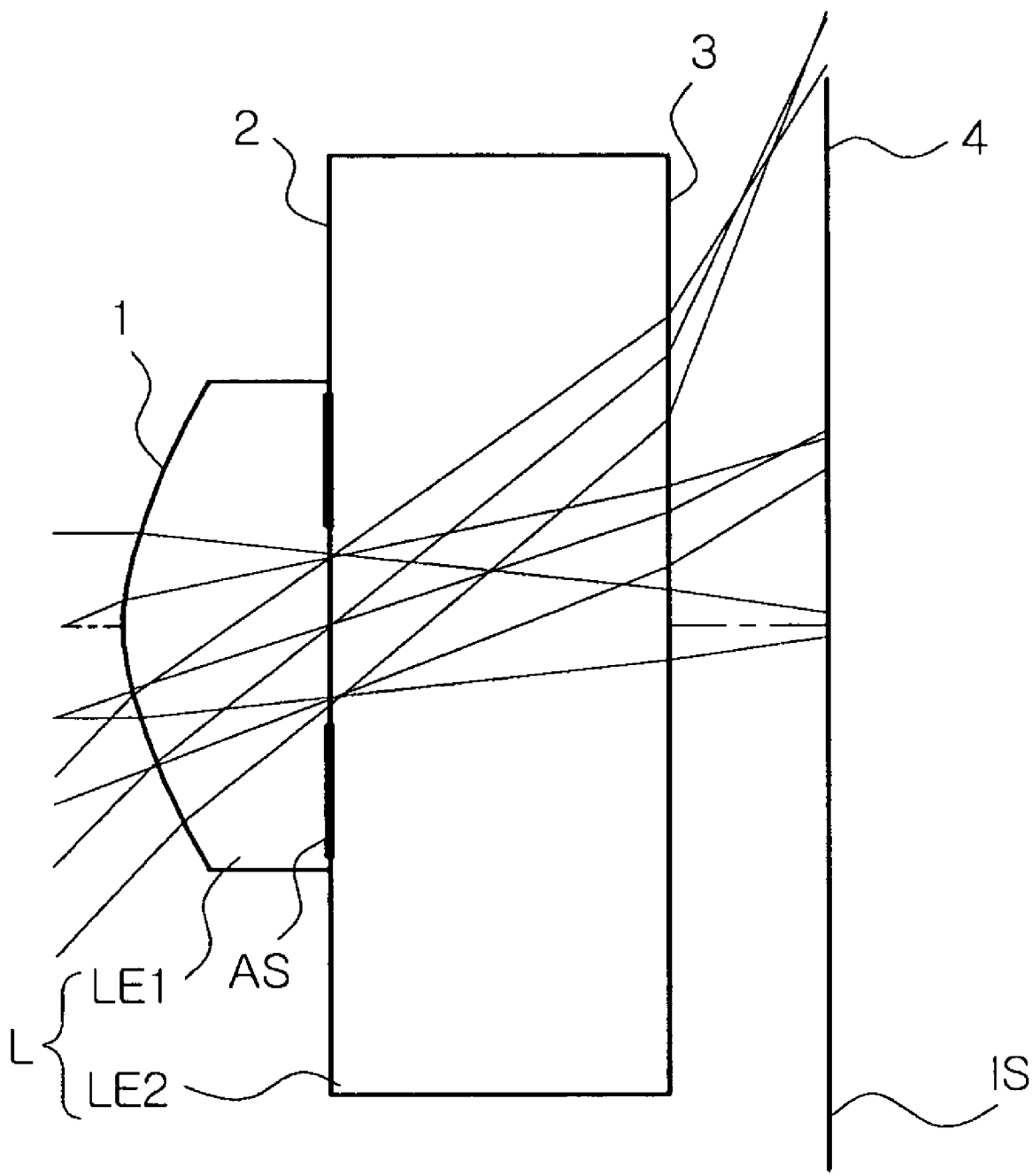
FIG. 5 is a lens configuration view illustrating an optical movement sensing system according to a first embodiment of the invention.

FIG. 2 is a schematic view illustrating an optical movement sensing system according to an exemplary embodiment of the invention. FIG. 3 is a schematic view illustrating an operation of an optical movement sensing system. FIG. 4 is a reference view for explaining an operation of an optical movement sensing system, in which A is a schematic view illustrating movement of an object on a screen, and B is a schematic view illustrating movement of an object on an image sensor. Also, FIG. 5 is a lens configuration view illustrating an optical movement sensing system according to a first embodiment of the present invention. In the following lens configuration views, the thicknesses, sizes and shapes of the lenses may be exaggerated for clarity. In particular, the shapes of spherical or aspherical surfaces shown in the views are only exemplary and should not be construed as limiting.

As shown in FIG. 2, an optical pointing device of the present invention includes a light source 110 emitting light, a lens 130 collecting light reflected from an object 120 by the light emitted from the light source 110, and an optical sensor 140 sensing an image of the light collected by the lens 130 and detecting movement of the object 120.

The light source 110 may employ a high-brightness light emitting diode (LED). However, the light source 110 is not limited thereto as long as the light emitted onto the object 120 and then reflected therefrom is perceived by the optical sensor 140. Moreover, the optical sensor 140 is not limited thereto as long as the optical sensor senses movement of the object 120.

However, to distinguish light outside the optical system and light emitted from the light source 110 and then reflected from the object 120, the light source 110 may be configured as an infrared ray LED. Here, the optical sensor 140 may be sensitive to infrared rays.

The optical movement sensing system of the present invention is of an ultra-small size and thus applicable to a mobile device such as a mobile telecommunication terminal. In this case, a finger surface may correspond to the object 120. That is, pointing (directing) can be performed by detecting movement of the finger surface serving as the object 120, with the pointing device fixed in a position.

An operation of the optical movement sensing system will be described in more detail with reference to FIGS. 3 and 4.

As shown in FIG. 3, light passing through the lens 130 is imaged on different locations of the optical sensor 140 such as an image sensor depending on positions P2, and P3 of the object 120. That is, when the object is located in the middle P1, the light is imaged in the middle of the optical sensor 140. When the object deviates more from the middle, the light is imaged on peripheral portions of the optical sensor 140.

For example, when the object moves from the right top to the left bottom in FIG. 4A, the light is variably imaged in response to locations of the moving object, as shown in FIG. 4B, and thus movements of the object may be detected to ensure pointing to be performed variously.

Meanwhile, the lens 130 may need to have a wide angle of view to detect movement of the object occurring at a close distance. Also, to enable compactness of the pointing device, the optical movement sensing system included therein needs to be sufficiently small.

That is, to be applied to a mobile device such as the mobile telecommunication terminal, the lens 130 should have a wide view of angle and a short focal length.

To this end, as shown in FIG. 5, the lens 130 may include a wide-angle lens L including a first lens element LE1 having a curved object-side surface, and a second lens element LE2 having an object-side surface 2 in contact with an image-side surface 2 of the first lens element LE1 and having a planar image-side surface 3. The lens 130 may satisfy conditions 1 and 2 which will be described later, but not limited thereto.

Also, the first lens element LE1 may have the object-side surface 1 formed of an aspherical surface to assure the light to be imaged on an off-axis and achieve sufficient resolution for recognizing movement of the object.

Furthermore, the wide-angle lens L including the first lens element LE1 and the second lens element LE2 has overall positive refractive power, thereby shortening an overall length of the optical system and reducing size of the optical sensor such as an image sensor.

Also, to assure easier manufacturing, the first lens element LE1 may be molded on or bonded to the object-side surface 2 of the second lens element LE2. For example, the first lens element LE1 may be molded on the object-side surface 2 of the second lens element LE2 composed of both planar surfaces by a replica method to facilitate mass production. The manufacturing method of the wide-angle lens L is not limited thereto. When the first lens element LE1 and the second lens element LE2 are formed separately as just described, the first lens element LE1 and the second lens element LE2 may be formed of materials having different refractive indices from each other to have an effect of increasing the number of refracting surfaces.

Contrary to what is described above, the first lens element LE1 and the second lens element LE2 may be formed integrally. That is, the wide-angle lens L may have a curved object-side surface 1 and a planar image-side surface 3.

Meanwhile, an aperture stop AS may be disposed on the object-side surface 2 of the second lens element LE2 to occupy less space, thereby reducing the optical system and facilitating assembling. This aperture stop AS may be installed by a known method such as coating of a light blocking material on the object side 2 of the second lens element LE2. However, a location of the aperture stop AS is not limited to FIG. 5 and the aperture stop AS may be installed in front of the wide-angle lens L.

Also, an infra-red (IR) pass filter (not shown) may be coated or attached on at least one of the object-side surface 2 and the image-side surface 3 of the second lens element LE2 so as to block light, particularly, a visible ray incident from outside the optical movement sensing system. That is, the IR-pass filter allows distinction between the light emitted from the light source 110, particularly, infrared ray LED and then reflected from the object 120 and the light incident from outside the optical movement sensing system, thereby ensuring effective sensing of movement.

In the wide-angle lens L of the present invention, the second lens element has the image-side surface 3 formed of a planar surface, thus easily manufactured. This also allows the optical sensor such as the image sensor and the wide-angle lens L to be assembled together more easily. Notably, the wide-angle lens L having one surface formed of a planar surface may be easily divided when manufactured by a replica method.

That is, the wide-angle lens L has the curved object-side surface 1 to assure sufficient resolution for sensing movement of the object. Also, the wide-angle lens L has the planar image-side surface 3 to be easily assembled to the optical sensor. Particularly, the wide-angle lens having the only one surface 1 formed of a curved surface is easily manufacturable.

Furthermore, the optical movement sensing system employs only one wide-angle lens L, thereby minimizing the optical system.

With the optical movement sensing system configured as above, operations of following conditions 1 and 2 will be examined.

$$1.2 \leq R1/D1 \leq 3.8 \quad \text{condition 1,}$$

where R1 is a radius of curvature of the object-side of the first lens element LE1, and D1 is a thickness of the first lens element LE1 on an optical axis.

Condition 1 prescribes a thickness and a shape of the first lens element LE1. Condition 1 should be satisfied to ensure resolution for recognizing movement of the object and relative illuminance.

Deviation from a lower limit of condition 1 decreases relative illuminance, rendering it hard to recognize movement of the object. Conversely, deviation from an upper limit of condition 1 lowers resolution, also rendering it hard to recognize the object.

$$0.19 < D1/D2 < 0.7 \quad \text{condition 2,}$$

where D1 is a thickness of the first lens element LE1 on an optical axis and D2 is a thickness of the second lens LE2 on an optical axis.

Condition 2 governs a thickness ratio between the first lens element LE1 and the second lens element LE2 constituting the wide-angle lens L.

Deviation from a lower limit of condition 2 degrades resolution too much, rendering it hard to recognize the object. Conversely, deviation from an upper limit of condition 2 increases the thickness of the first lens element LE1 on an optical axis and thus adds to size and volume of the optical system, thereby hardly applicable to the mobile device Hereinafter, the optical movement sensing system including the wide-angle lens L will be described through specific numerical examples.

Wide-angle lenses L of first to fourth embodiments as described above are used in an optical movement sensing system in which light emitted from the light source 110 and then reflected from the object 120 is collected to be imaged on an optical sensor 140.

Here, a wide-angle lens L includes a first lens element LE1 having a curved object-side surface 1, and a second lens element LE2 having an object side-surface 2 in contact with an image-side surface of the first lens element LE1 and having a planar image-side surface 3. Also, the wide-angle lens L has the object-side surface 1 formed of an aspheric surface.

Furthermore, an aperture stop AS is installed inside the wide-angle lens L to block unnecessary light and an image plane IS is disposed behind the image-side surface 3. The image plane IS corresponds to the optical sensor 140 of FIG. 2 and senses light reflected from the object 120 and collected by a lens 130.

Each of the aspherical surfaces used in each of embodiments herein is obtained from following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots, \quad \text{Equation 1}$$

where Z is a distance from a vertex of a lens in an optical axis, Y is a distance in a direction perpendicular to the optical axis, c is a reciprocal number of a radius of curvature at a vertex of the lens, K is a conic constant and A, B, C, D, E and F are aspherical coefficients.

First Embodiment

Table 1 below shows numerical values according to a first embodiment of the present invention.

Figure 6:
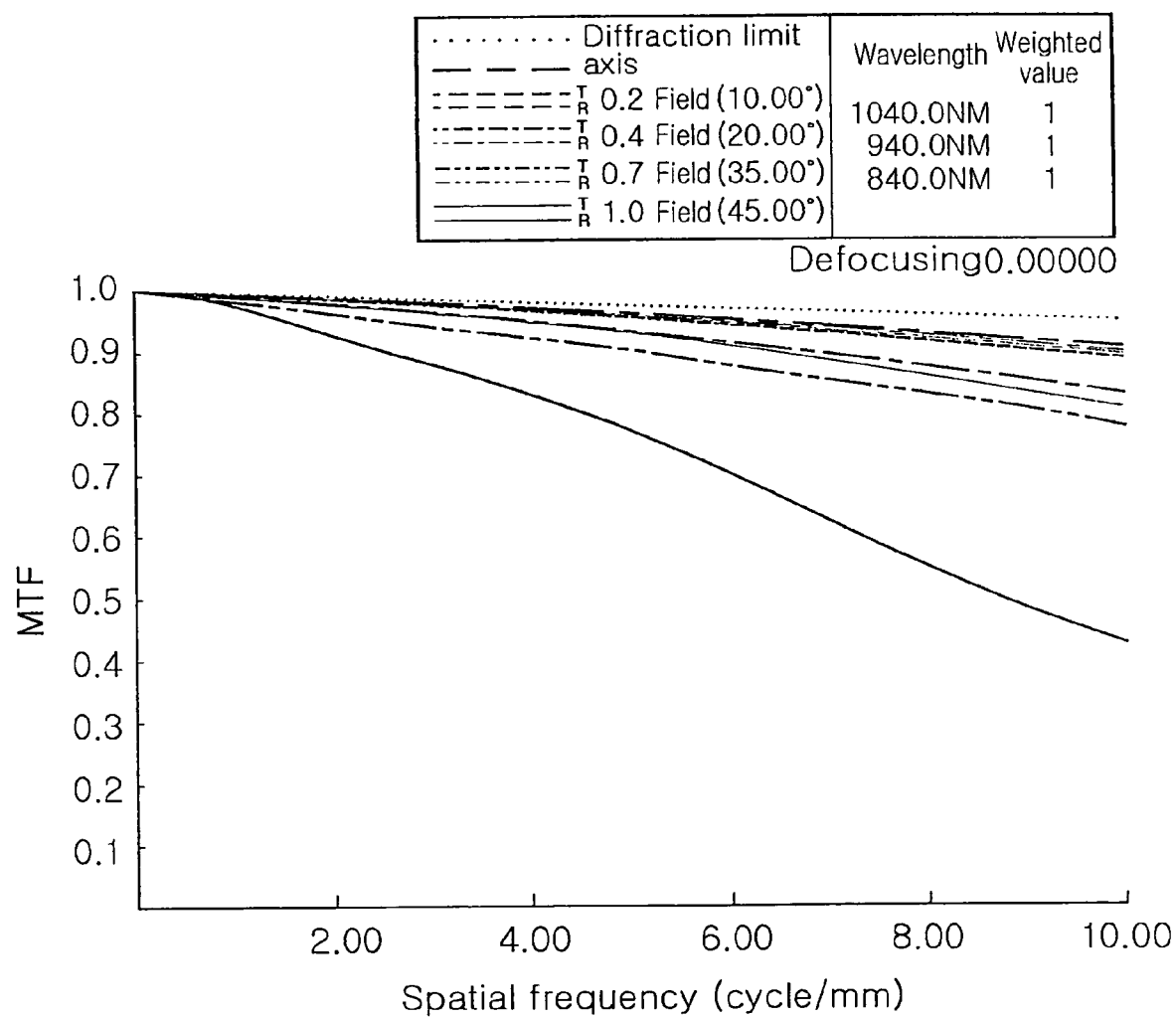
FIG. 6 is a graph illustrating modulation transfer function (MTF) characteristics of the optical movement sensing system according to the embodiment of the invention shown in FIG. 5.

FIG. 5 is a view illustrating a lens arrangement of an optical movement sensing system according to the first embodiment of the invention. FIG. 6 is a graph illustrating modulation transfer function (MTF) characteristics of the optical movement sensing system according to the first embodiment of the invention shown in FIG. 5.

In the first embodiment, a total focal length f of the optical system is 0.612 mm, an angle of view $2\omega$ is 90°, and a F number is 3.0.

TABLE 1

| Surface No. | Radius of curvature R | Thickness or distance D | Refractive index $N_d$ | Abbe number $v_d$ | Remark |
|---|---|---|---|---|---|
| *1 | 0.2901 | 0.2418 | 1.4821 | 51.3 | First lens element |
| 2 | ∞ | 0.4000 | 1.474 | 65.4 | Second lens element/ Aperture stop |
| 3 | ∞ | 0.1875 | | | |
| 4 | ∞ | — | | | |

In Table 1, * denotes an aspherical surface, and a conic constant K and aspherical coefficients A and B are derived according to Equation 1 as noted in Table 2 below.

TABLE 2

| Surface No. | K | A | B |
|---|---|---|---|
| *1 | −2.82239 | −1.68936 | 14.35574 |

Second Embodiment

Table 3 below shows numerical values according to a second embodiment of the present invention.

Figure 7:
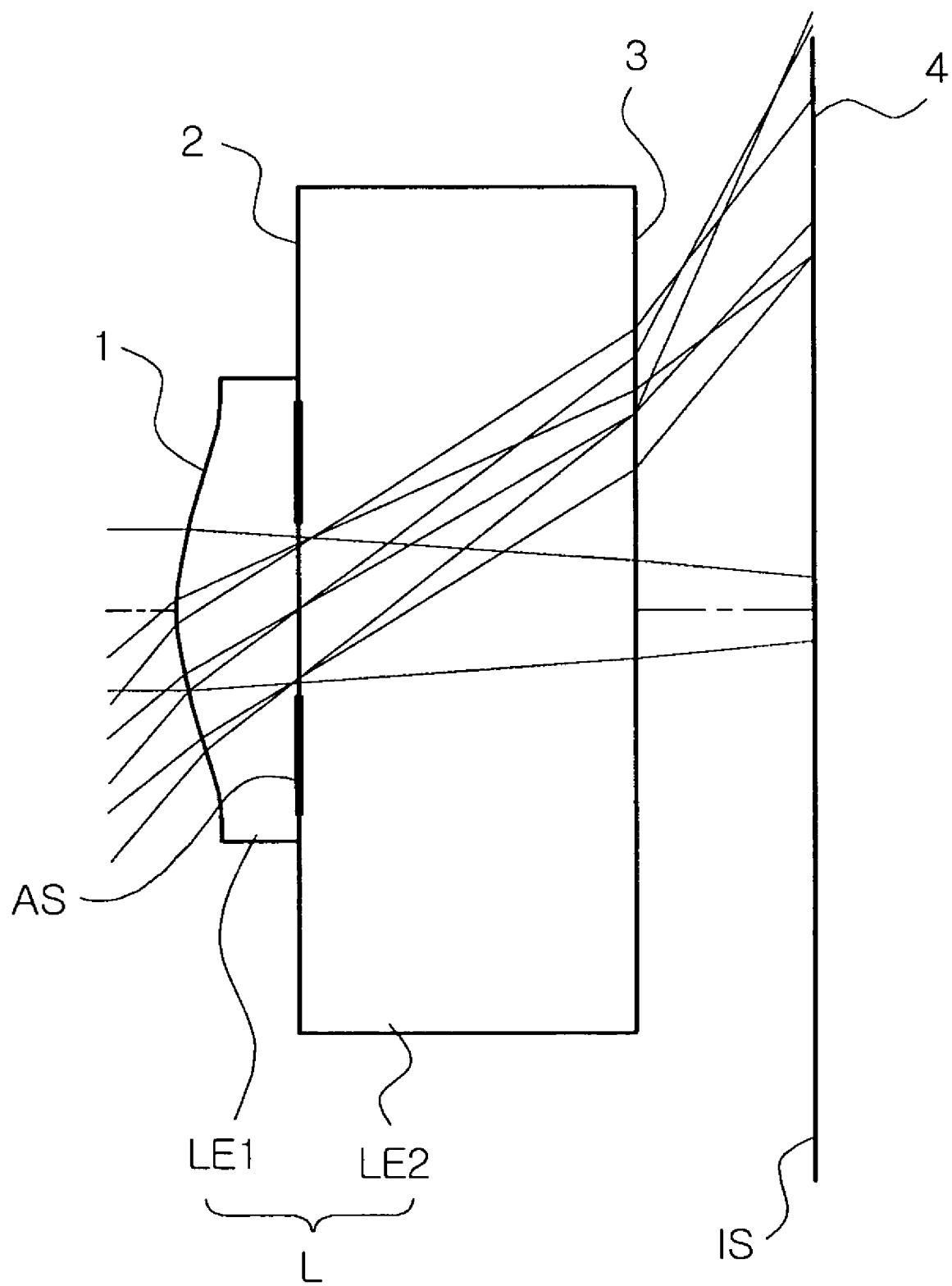
FIG. 7 is a lens configuration view illustrating an optical movement sensing system according to a second embodiment of the invention.
Figure 8:
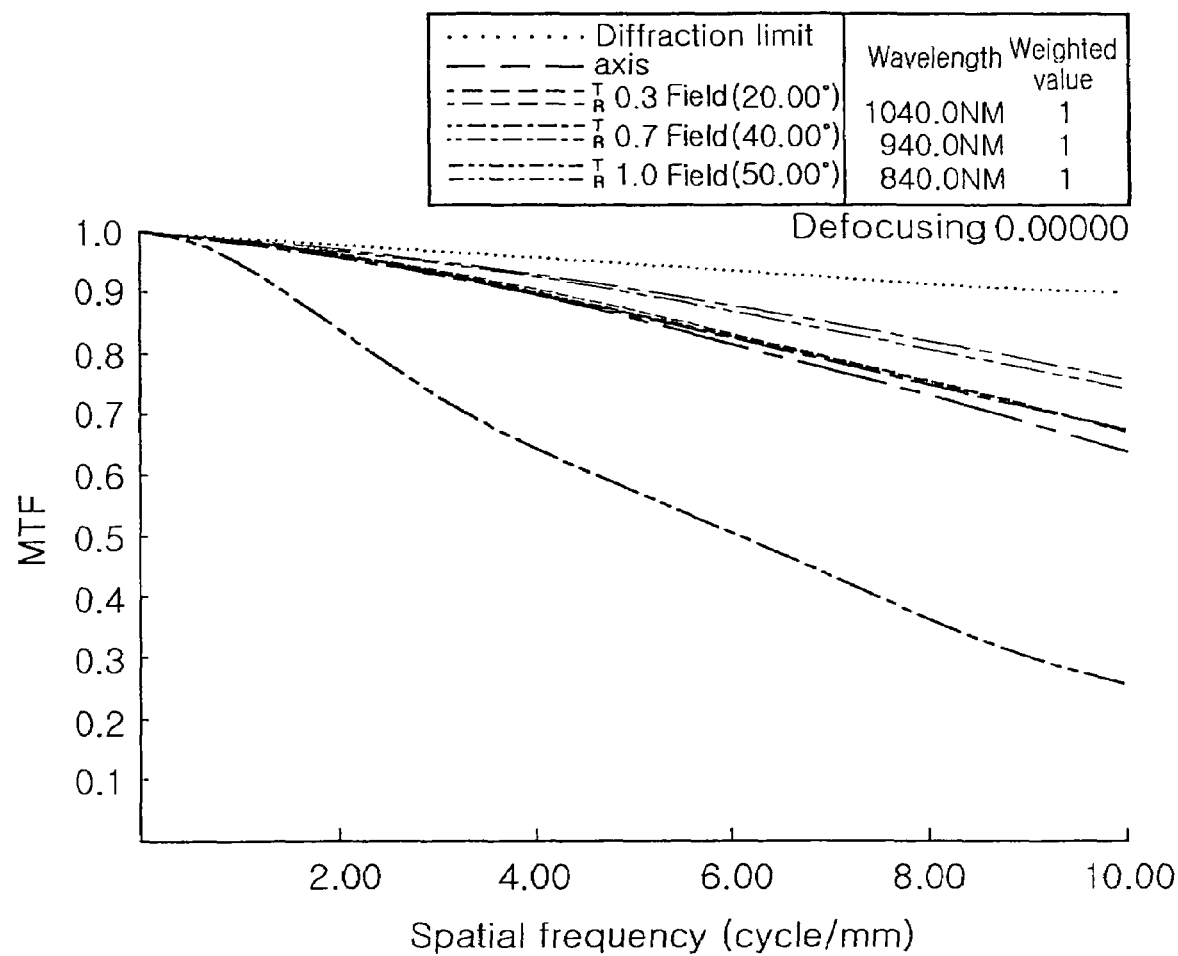
FIG. 8 is a graph illustrating MTF characteristics of the optical movement sensing system according to the embodiment of the invention shown in FIG. 7.

FIG. 7 is a view of a lens arrangement of an optical movement sensing system according to the second embodiment, and FIG. 8 is a graph illustrating MTF characteristics of the optical movement sensing system shown in FIG. 7. In the second embodiment, a total focal length f of the optical system is 0.566 mm, an angle of view $2\omega$ is 100° and an F number is 3.0.

TABLE 3

| Surface No. | Radius of Curvature R | Thickness or distance D | Refractive index $N_d$ | Abbe number $v_d$ | Remark |
|---|---|---|---|---|---|
| *1 | 0.2685 | 0.1413 | 1.4821 | 51.3 | First lens element |
| 2 | ∞ | 0.4000 | 1.474 | 65.4 | Second lens element/aperture stop |
| 3 | ∞ | 0.2082 | | | |
| 4 | ∞ | — | | | |

In Table 3, * denotes an aspherical surface, and a conic constant K and aspherical coefficients A and B are derived according to Equation 1 as noted in Table 4.

TABLE 4

| Surface No. | K | A | B |
|---|---|---|---|
| *1 | −18.7506 | 8.333078 | −109.037 |

Third Embodiment

Table 5 below shows numerical values of the optical movement sensing system according to a third embodiment of the present invention.

Figure 9:
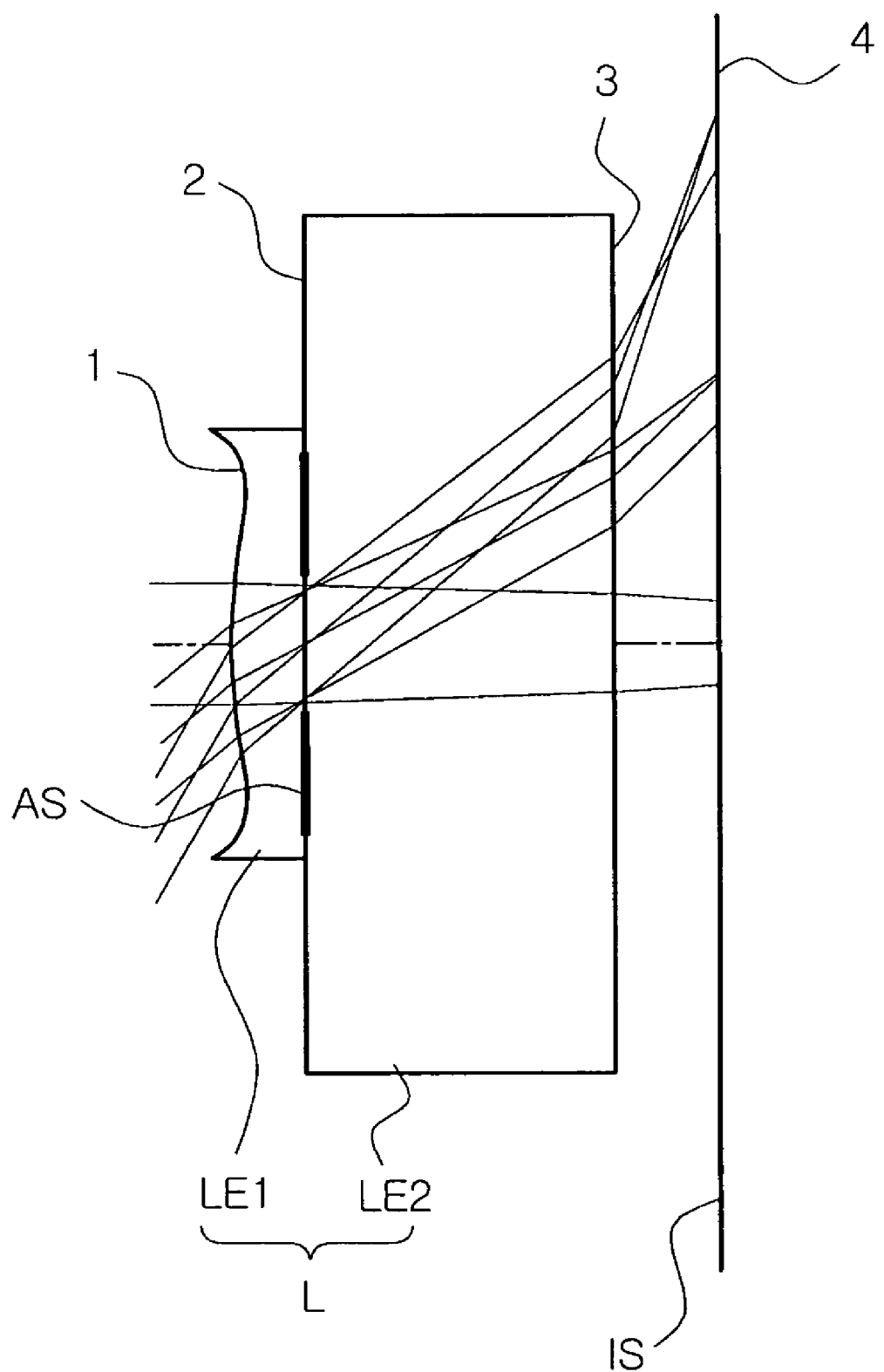
FIG. 9 is a lens configuration view illustrating an optical movement sensing system according to a third embodiment of the invention.
Figure 10:
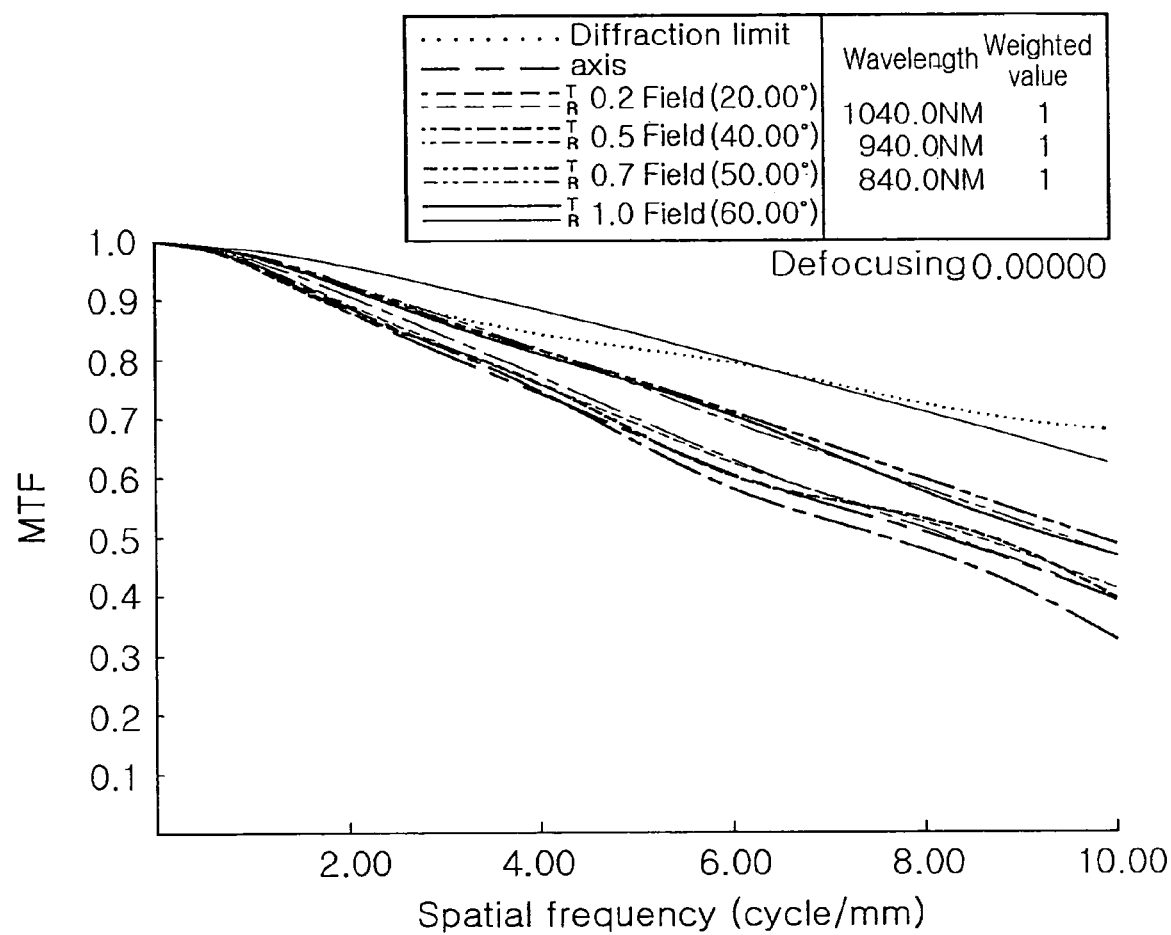
FIG. 10 is a graph illustrating MTF characteristics of the optical movement sensing system according to the embodiment of the invention shown in FIG. 9.

FIG. 9 is a view of a lens arrangement of a movement sensing optical system according to the third embodiment. FIG. 10 is a graph illustrating MTF characteristics of the optical movement sensing system shown in FIG. 9.

In the third embodiment, a total focal length f of the optical system is 0.465 mm, an angle of view 2ω is 120° and an F number is 3.0.

TABLE 5

| Surface No. | Radius of curvature R | Thickness or distance D | Refractive index $N_d$ | Abbe number $v_d$ | Remark |
|---|---|---|---|---|---|
| *1 | 0.2203 | 0.1000 | 1.4821 | 51.3 | First lens element |
| 2 | ∞ | 0.4000 | 1.474 | 65.4 | Second lens element/Aperture stop |
| 3 | ∞ | 0.1310 | | | |
| 4 | ∞ | — | | | |

In Table 5, * denotes an aspherical surface, and a conic constant K and aspherical coefficients A and B are derived according to Equation 1 as noted in Table 6.

TABLE 6

| Surface No. | K | A | B |
|---|---|---|---|
| *1 | −104.867 | 11.33555 | −246.282 |

Fourth Embodiment

Table 7 below shows numerical values of an optical movement sensing system according to a fourth embodiment of the present invention.

Figure 11:
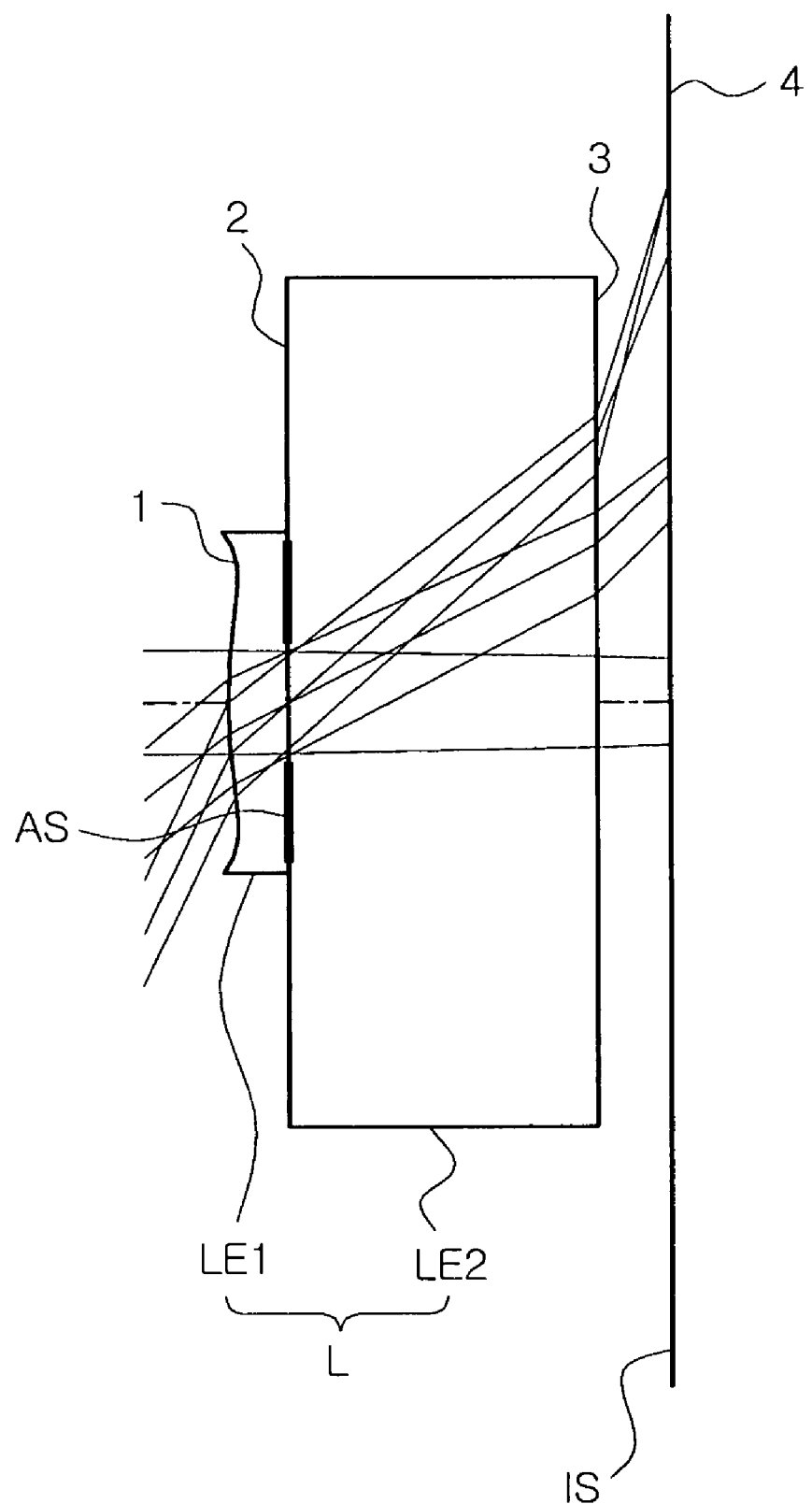
FIG. 11 is a lens configuration view illustrating an optical movement sensing system according to a fourth embodiment of the invention.
Figure 12:
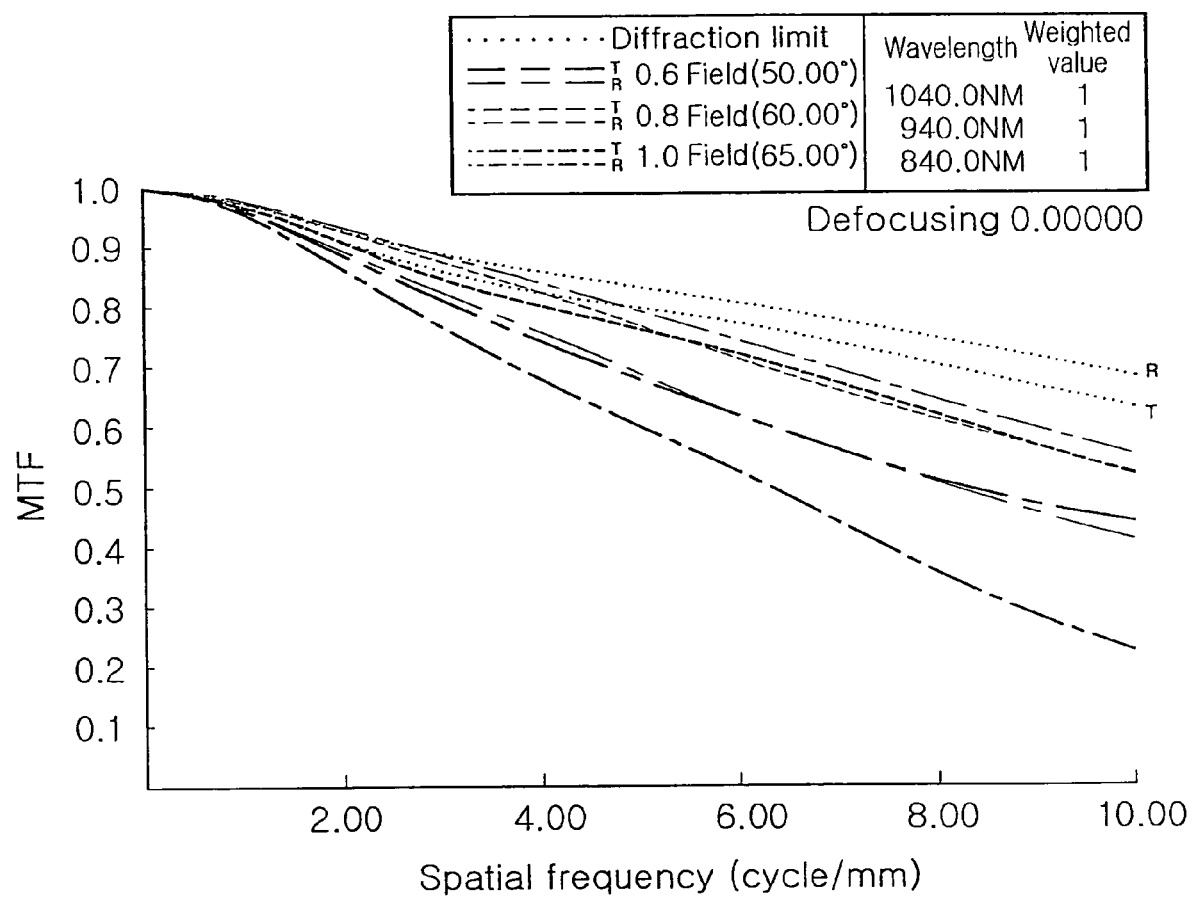
FIG. 12 is a graph illustrating MTF characteristics of the optical movement sensing system according to the embodiment of the invention shown in FIG. 11.

FIG. 11 is a view of a lens arrangement of an optical movement sensing system according to the fourth embodiment and FIG. 12 is a graph illustrating MTF characteristics of the optical movement sensing system shown in FIG. 11.

In the fourth embodiment, a total focal length f of the optical system is 0.418 mm, an angle of view 2ω is 130° and an F number is 3.0.

TABLE 7

| Surface No. | Radius of curvature R | Thickness or distance D | Refractive index $N_d$ | Abbe number $v_d$ | Remark |
|---|---|---|---|---|---|
| *1 | 0.1984 | 0.0776 | 1.4821 | 51.3 | First lens element |
| 2 | ∞ | 0.4000 | 1.474 | 65.4 | Second lens element/Aperture stop |
| 3 | ∞ | 0.1000 | | | |
| 4 | ∞ | — | | | |

In Table 7, * denotes an aspherical surface, and a conic constant K and aspherical coefficients A and B are derived according to Equation 1 as noted in Table 8.

TABLE 8

| Surface No. | K | A | B |
|---|---|---|---|
| *1 | −197.131 | 12.36166 | −399.545 |

In the meantime, values of conditions 1 and 2 according to the first to fourth embodiments are noted in Table 9 below.

TABLE 9

| | First embodiment | Second embodiment | Third embodiment | Fourth embodiment |
|---|---|---|---|---|
| Condition 1 (R1/D1) | 1.200 | 1.900 | 2.203 | 2.558 |
| Condition 2 (D1/D2) | 0.250 | 0.353 | 0.604 | 0.194 |

As seen from Table 9 above, the first to fourth embodiments satisfy conditions 1 and 2.

Also, as shown in FIGS. 6, 8, 10 and 12, the optical movement sensing system exhibits a resolution of 10 cycle/mm when the MTF is 0.3 (30%), thereby sufficiently sensing movement of the object.

For example, as shown in FIG. 4, in a case where a screen is divided into nine areas, the optical movement sensing system requires a resolution of about 5 cycle/mm, which may change depending on a size of the image sensor (optical sensor) or a number of pixels, to ensure that respective areas are distinguished from one another. Considering this, the optical movement sensing system according to the embodiments of the present invention ensures sufficient resolution for identifying movement of the object.

As set forth above, according to exemplary embodiments of the invention, only one wide-angle lens is employed to sense movement of an object. This allows an optical system to be reduced in size and weight, thereby applicable to a mobile device such as a mobile telecommunication terminal.

Notably, the optical system has a wide angle of view of at least 90° and assures sufficient peripheral light amount. This enables movement of the object to be sufficiently perceived even in peripheral portions of the optical sensor.

Moreover, an aperture stop is disposed inside the wide-angle lens, thus not requiring an additional space therefor. Also, the aperture stop, not necessary to be installed outside the optical system, facilitates assembling of the optical system.

In addition, the wide-angle lens has a curved object-side surface to ensure resolution for sensing movement of an object. Meanwhile, the wide-angle lens has a planar image-side surface, thus allowing an optical sensor and the wide-angle lens to be easily assembled together. Notably, the wide-angle lens has only one of refracting surfaces formed of a curved surface, thereby easily manufactured. Moreover, only one wide-angle lens is utilized to thereby minimize the optical system.

While the present invention has been shown and described in connection with the exemplary embodiments, it will be apparent to those skilled in the art that modifications and variations can be made without departing from the spirit and scope of the invention as defined by the appended claims.

What is claimed is:

1. An optical movement sensing system comprising:
   a light source to emit light to an object;
   a wide-angle lens to collect the light reflected from the object, the wide-angle lens comprising a first lens element having a convex object-side surface and a planar image-side surface and a second lens element having a planar object-side surface in surface contact with the planar image-side surface of the first lens element and having a planar image-side surface; and
   an optical sensor to sense an image of the light collected by the wide-angle lens and to detect movement of the object.

2. The optical movement sensing system of claim 1, wherein the object-side surface of the first lens surface is aspheric.

3. The optical movement sensing system of claim 1, wherein the first lens element has a thickness and a shape according to following condition 1, $$1.2 \leq R1/D1 \leq 3.8 \qquad \text{condition 1,}$$

where R1 is a radius of curvature of the object-side surface of the first lens element, and D1 is a thickness of the first lens element on an optical axis.

4. The optical movement sensing system of claim 1, wherein the first lens element and the second lens element have a thickness, respectively, according to following condition 2, $$0.19 < D1/D2 < 0.7 \qquad \text{condition 2,}$$

where D1 is a thickness of the first lens element on an optical axis, and D2 a thickness of the second lens on an optical axis.

5. The optical movement sensing system of claim 1, wherein the first lens element is molded on or bonded to the object-side surface of the second lens element.

6. The optical movement sensing system of claim 1, wherein the first lens element and the second lens element are formed integral with each other.

7. The optical movement sensing system of claim 1, wherein the first lens element and the second lens element have different refractive indices from each other.

8. The optical movement sensing system of claim 1, wherein an aperture stop is disposed on the object-side surface of the second lens element to block unnecessary light.

9. The optical movement sensing system of claim 1, wherein the object reflects light emitted from the light source.

10. The optical movement sensing system of claim 1, wherein the second lens element has an infra-red pass filter coated or attached on one of the surfaces thereof.

* * * * *

UNITED STATES PATENT AND TRADEMARK OFFICE
CERTIFICATE OF CORRECTION

| | | |
|---|---|---|
| PATENT NO. | : 7,723,669 B2 | Page 1 of 1 |
| APPLICATION NO. | : 12/000673 | |
| DATED | : May 25, 2010 | |
| INVENTOR(S) | : Hye Ran Oh et al. | |

It is certified that error appears in the above-identified patent and that said Letters Patent is hereby corrected as shown below:

Column 10, Line 15 (Approx.) delete "D2 a" and insert --D2 is a--.

Signed and Sealed this
Fourth Day of January, 2011

David J. Kappos
*Director of the United States Patent and Trademark Office*